United States Patent
Steed, Deceased et al.

[15] 3,675,799
[45] July 11, 1972

[54] PARKING APPARATUS WITH POWERED PALLETS IN EACH PARKING STALL

[72] Inventors: Frank Streeton Steed, Deceased, late of Bath, England; by Robert Mark Rutherford, executor, Somerset, England; by Mary Phyllis Steed, executrix, Somerset, England; Henry Lawson-Tancred, Boroughbridge, England

[73] Assignee: Anthony Sigston Thompson, Harrogate, England

[22] Filed: Sept. 21, 1970

[21] Appl. No.: 74,173

Related U.S. Application Data

[63] Continuation of Ser. No. 738,735, June 17, 1968, abandoned.

[30] Foreign Application Priority Data

July 12, 1967 Great Britain.....................32,154/67

[52] U.S. Cl. .................................................214/16.1 CB
[51] Int. Cl. ...........................................................E04h 6/06
[58] Field of Search..........................................214/16.1 CB

[56] References Cited

UNITED STATES PATENTS

| | | | |
|---|---|---|---|
| 2,826,312 | 3/1958 | Francis | 214/16.1 |
| 3,054,518 | 9/1962 | Coursey | 214/16.1 |
| 3,161,303 | 12/1964 | Burrows | 214/16.1 |
| 3,204,785 | 9/1965 | Bajulaz | 214/16.1 |
| 3,301,413 | 1/1967 | Coursey | 214/16.1 |
| 3,339,709 | 9/1967 | Bajulaz | 214/16.1 |

FOREIGN PATENTS OR APPLICATIONS

| | | | |
|---|---|---|---|
| 1,126,584 | 3/1962 | Germany | 214/16.1 |
| 763,644 | 12/1956 | Great Britain | 214/16.1 |

Primary Examiner—Robert G. Sheridan
Assistant Examiner—R. B. Johnson
Attorney—Pierce, Scheffler & Parker

[57] ABSTRACT

A multi-story mechanical storage system for vehicles (or other means) providing receiving spaces at each level in register with a vertical lift shaft, a lifting structure in said shaft for carrying a vehicle to a selected level, movable pallets for supporting vehicles in storage, said lifting structure and pallets being of skeleton formation including laterally extending tines which enable the said structure to pass down past a pallet moved into the shaft so that a vehicle on the structure will remain behind on the pallet, the loaded pallet then being moved back into its receiving space.

6 Claims, 13 Drawing Figures

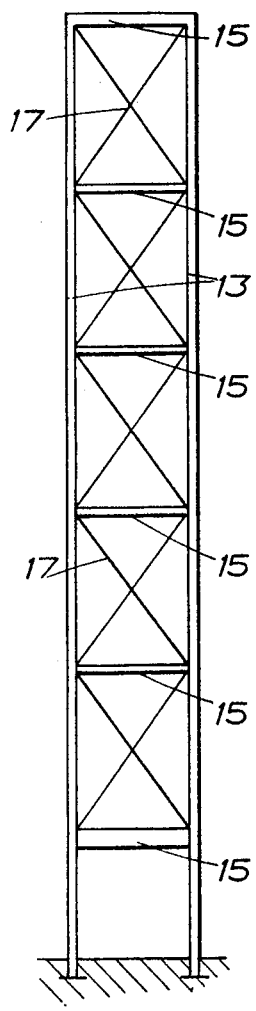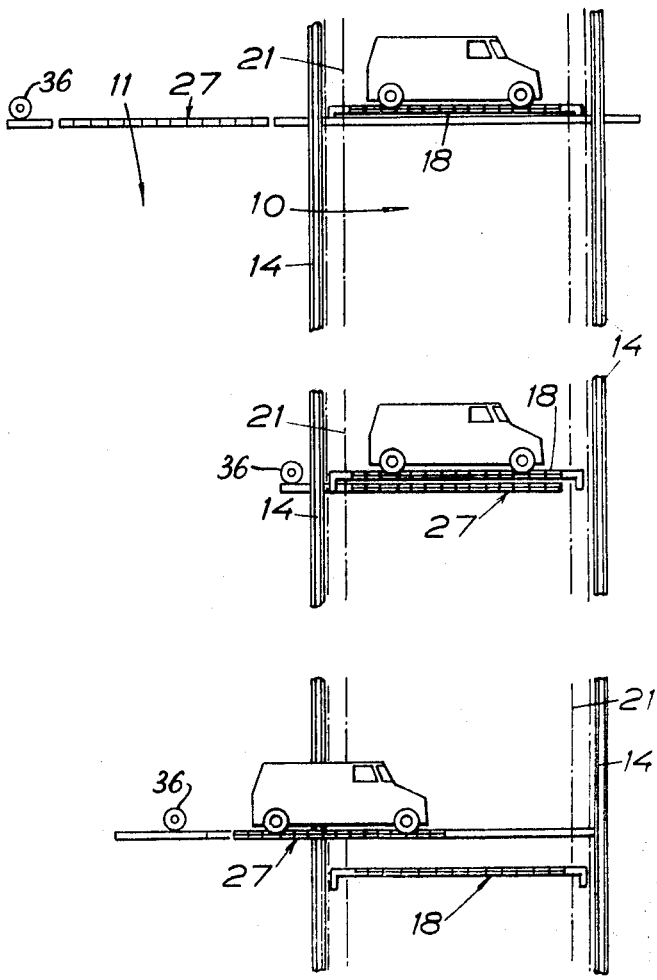

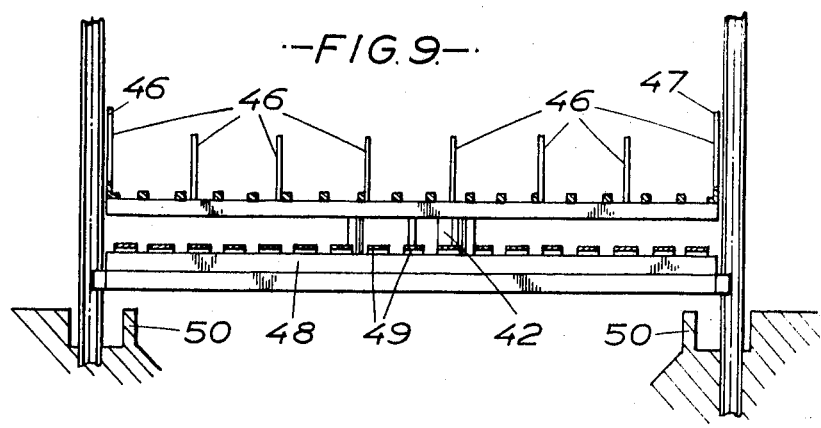
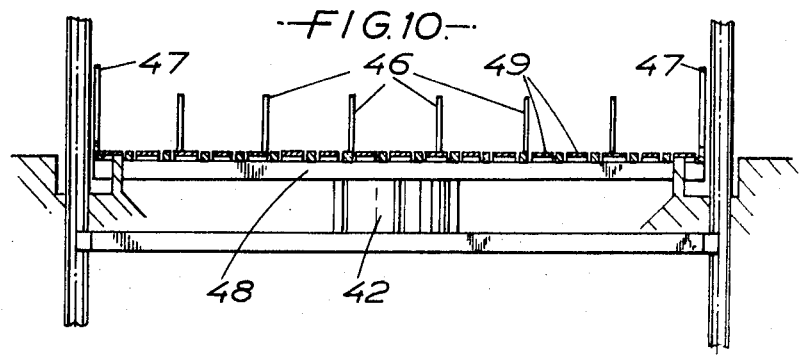
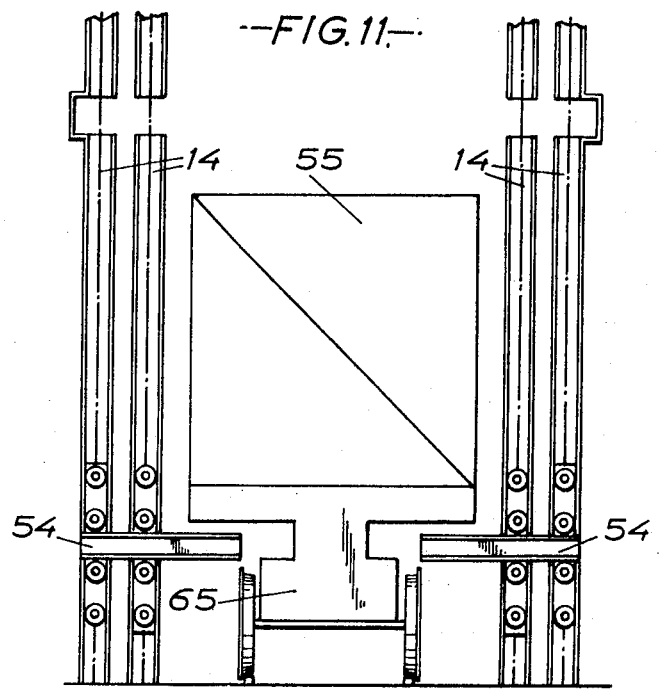

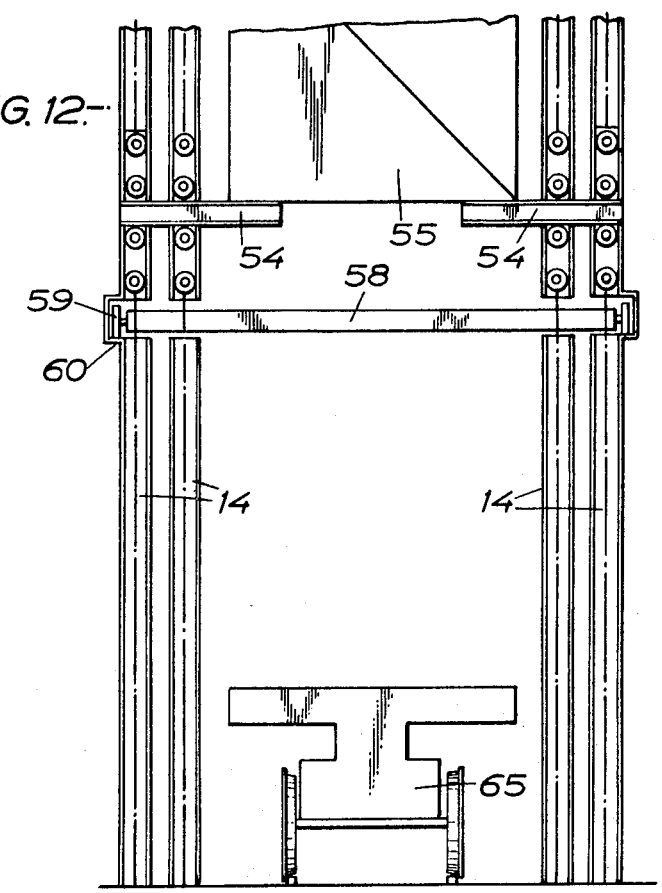
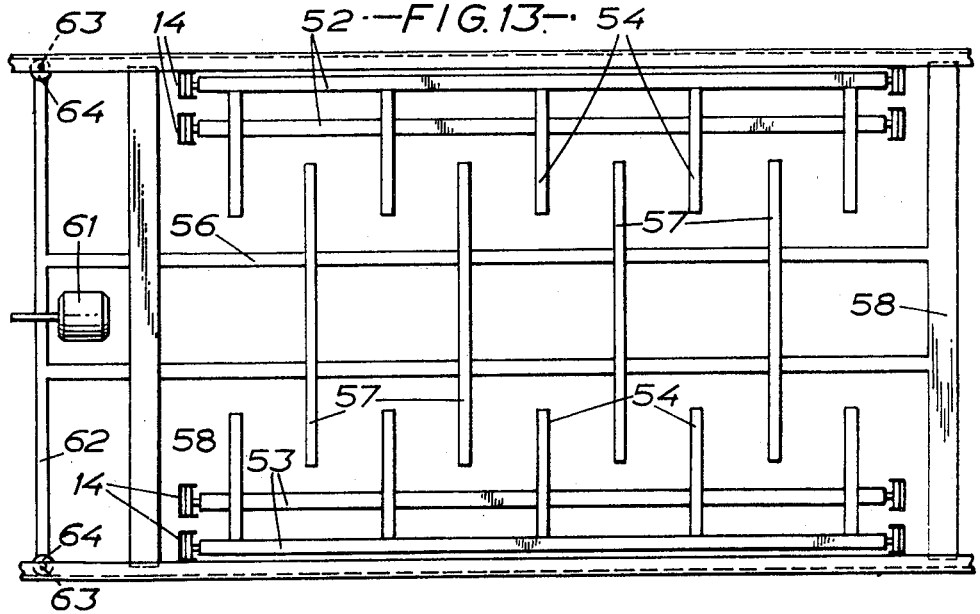

PARKING APPARATUS WITH POWERED PALLETS IN EACH PARKING STALL

This invention is a continuation of Ser. No. 738,735 filed June 17, 1968 which is now abandoned.

This invention relates to multi-story mechanical article storage systems of the kind comprising a number of superimposed receiving spaces for articles disposed on at least one side of a lift shaft having a lifting structure for supporting the article and movable up and down in said lift shaft and power means for effecting that movement, and a pallet or the like for transferring the article from the lifting structure to a selected cubicle or vice-versa. The term article as used throughout the specification is intended to include motor vehicles such as cars, containers and the like.

Heretofore it has been usual for said pallet to be raised and lowered with the lifting structure.

According to this invention a multi-story mechanical storage system of the kind referred to is characterized in that a pallet or the like is associated with each receiving space, and in that there are provided means for moving each pallet from its receiving space into and out of the lift shaft, the arrangement being such that the pallet may be moved into the shaft below the article when the lifting structure is holding the article above the level of the pallet and the pallet may be moved back into the receiving space with the article when the lifting structure has been lowered.

The lifting structure and the pallet may be so formed that when the lifting structure is moved to a position above the level of the pallet in the receiving space and the pallet has been projected into the lift shaft beneath the lifting structure, and the lifting structure is lowered, portions of the pallet pass through spaces in the lifting structure and engage the article and the article is left supported by the pallet which can then be withdrawn into the receiving space and the lifting structure is then lowered, to receive another article.

The lift shaft may be provided at the level of each receiving space with means for supporting a pallet when projected into the shaft.

In one arrangement the lifting structure may be provided with a base portion from which projects upwardly a central portion extending in a fore and aft direction with respect to the lift shaft, and having a number of spaced tines extending laterally from each side thereof for supporting the article, and each pallet comprises two horizontal longitudinal members or structures spaced apart so that they lie beyond the ends of the tines on opposite sides of the elevated central portion of the lifting structure each of which longitudinal members is provided with spaced, laterally extending tines so that the tines on the lifting structure can pass up or down between them.

Alternatively, the pallet may be provided with a base portion extending in a fore and aft direction with respect to a receiving space, and having a number of spaced tines extending laterally from each side thereof for supporting the article, and each lifting structure comprises two horizontal longitudinal members or structures spaced apart so that they lie beyond the ends of the tines on opposite sides of the base portion of each pallet each of which longitudinal members is provided with spaced, laterally extending tines so that the tines on the pallets can pass up and down between them.

In the case where the pallet comprises two horizontal longitudinal members or structures the two members or structures may be rigidly braced together by a cross member only at those ends which are disposed furthest from the lift shaft when the pallet is on its receiving space.

The length of the longitudinal member may be such that the cross member never enters the lift shaft. Preferably, the longitudinal structure is made up of two parts of longitudinal members arranged side-by-side, the members of each pair being superimposed and the tines being secured between the members of both pairs.

The pallet may be constrained to move from the receiving space on to the lift shaft and vice versa by a number of pairs of superimposed rollers on opposite sides of the receiving space and of the lift shaft between which the longitudinal members move, and one pulley of each pair engaging an upper part of the longitudinal member and the other roller engaging the underpart.

An additional roller may be associated with the lower roller of each pair and arranged coaxially therewith, which latter rollers engage respectively a pair of said longitudinal members of the pallet.

In any of the above arrangements in which the longitudinal members of the pallet are constrained to move between pairs of rollers the rollers may be flanged so that the pallet is positively guided into and out of the receiving space and the lift shaft.

The rollers may be of the caster type.

In any of the arrangements referred to above each pallet may be provided with a motor for driving it.

In the case where the pallet comprises longitudinal members connected together at one end by a cross member the motor may be mounted on the cross member and drives a cross shaft extending for substantially the whole width of the pallet to the ends of which are secured pinions which engage racks secured to opposite sides of the receiving space and extending towards and preferably stopping short of the lift shaft.

The motor may be an electric motor and means may be provided for rendering the motor inoperative at predetermined limits of travel of the pallet so that the tines are accurately located with respect to those of the lifting structure enabling the latter to pass through the spaces in the former.

The means for rendering the motor inoperative may comprise switch mechanism operated by movement of the pallet and in circuit with the motor and with electromagnetic means which control brake mechanism associated with the motor.

In the case where the aforesaid lifting structure comprises two horizontal longitudinal members or structures each having laterally extending spaced tines the tines may be pivotally attached to the two horizontal longitudinal members so that the lifting structure can be moved down past an article to be lifted and the tines can then be swung under the article and means are provided for supporting the tines in horizontal attitude so that on upward movement of the lifting structure the article is also lifted.

The following is a description of a number of embodiments of the invention reference being made to the accompanying drawings in which:

FIG. 2 is an end elevation of the system shown in FIG. 1;

FIG. 4 is a schematic view of the system showing a sequence of car parking operations;

FIG. 9 is a similar view to FIG. 7 showing part of the system in more detail;

FIG. 10 is a similar view to FIG. 9 showing the parts of the system in a further position;

FIG. 11 is a side elevation of part of a multi-story container storage system;

FIG. 12 is a similar view to FIG. 11 and shows the parts of the system in a different position; and FIG. 13 is a plan view of part of the system shown in FIGS. 11 and 12.

Figure 1:
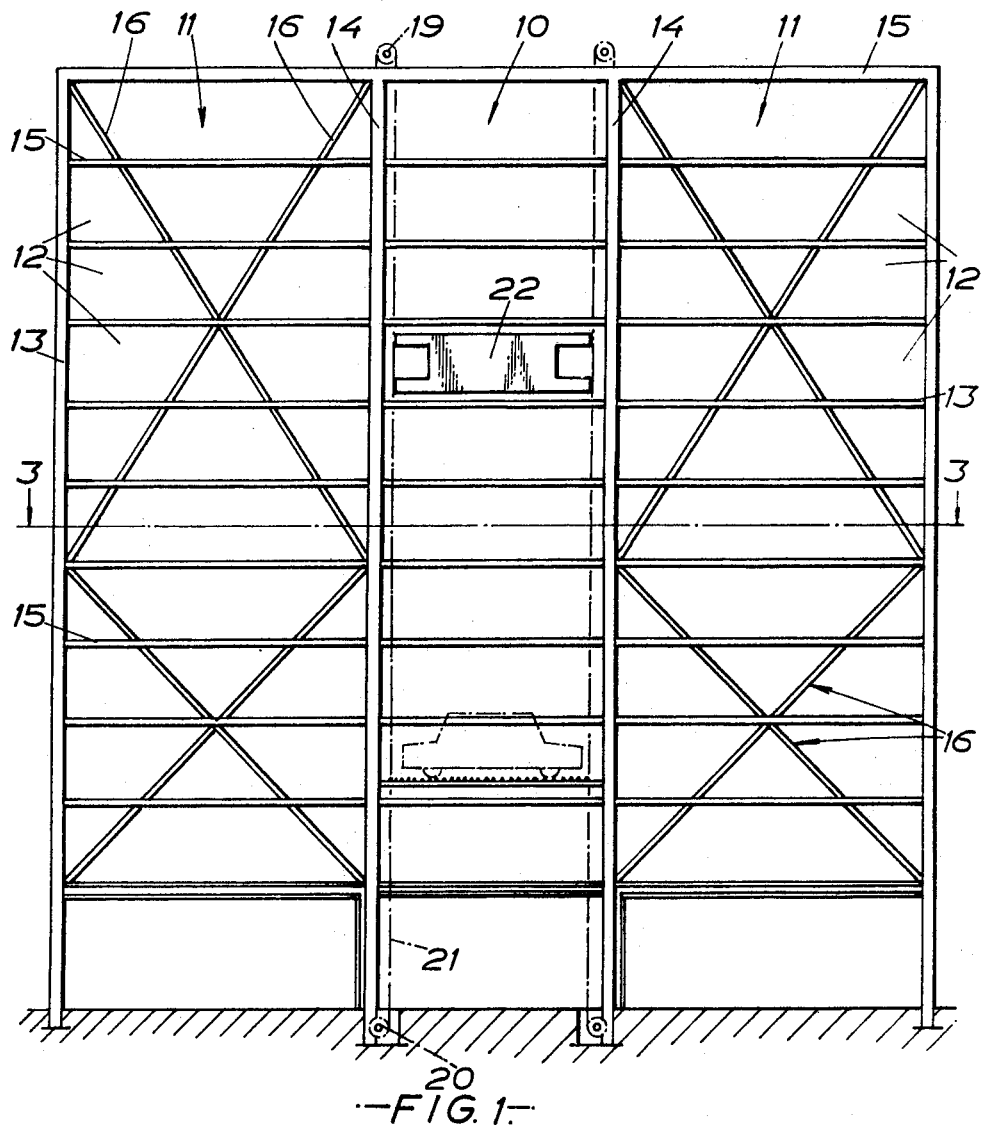
FIG. 1 is a side elevation of a multi-storey car parking system.
Figure 3:
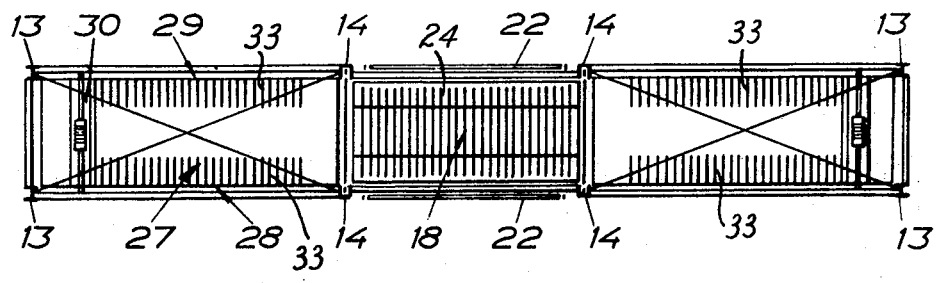
FIG. 3 is a section on the line 3—3 of FIG. 1.

Referring to FIGS. 1 to 3 of the drawings there is shown a multi-story mechanical car parking system comprising a vertically extending open framework which provides a lift shaft indicated at 10 and on either side of the lift shaft further shafts 11 which are divided into vertically spaced compartments or receiving spaces 12 in which cars may be parked.

The framework comprises four I-section vertically extending columns 13 spaced apart at the corners of a rectangle. The lift shaft 10 is defined within the rectangle by four further vertically extending columns 14 also spaced apart at the corners of a rectangle and located so as to leave said further shafts 11 on either side of the lift shaft 10.

The framework is divided into a number of levels by horizontal beams 15 which connect the columns together and thereby render the framework rigid. The columns 13 are also connected to the columns 14 by X-braces 16 which further stiffen the framework and further X-braces 17 connect the columns 13 at each end of the structure together.

Working within the lift shaft is a lift frame 18 referred to in greater detail later. Extending along each of the columns 14 and around sprockets 19 and 20 at the upper and lower ends of the columns are endless chains 21. The sprockets 20 are drivably rotated in either direction by a motor (not shown). One stretch of each of the chains is secured to a corner of the lift frame and counterweights 22 located at the front and rear of the framework are secured to the other stretches at the front and rear of the framework respectively.

Figure 5:
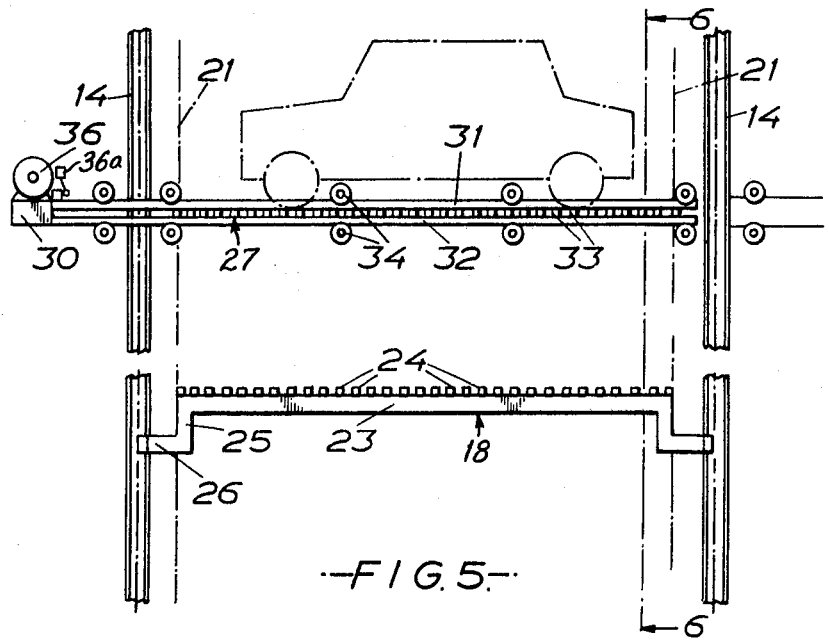
FIG. 5 is a similar view to FIG. 1 showing part of the system in more detail.
Figure 6:
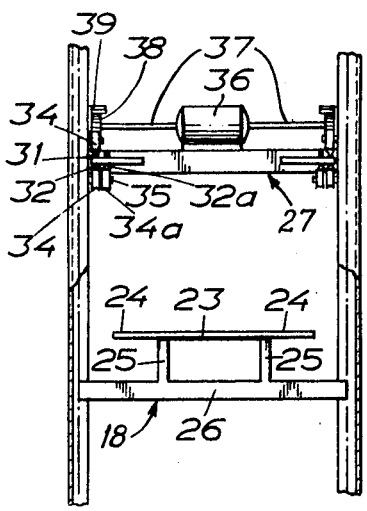
FIG. 6 is a sectional view on the line 6—6 of FIG. 5.

As best seen in FIGS. 5 and 6 the lift frame 18 comprises a central structure 23 which extends along the lift shaft having a number of spaced tines 24 extending laterally from each side thereof for supporting the car wheels. The ends of the central structure 23 are connected by downwardly extending struts 25 to a cross member 26 the ends of which are secured to the aforesaid chains.

In each of the aforesaid compartments 12 there is arranged a pallet 27 on which a car is supported during parking in the compartment. As best seen in FIG. 3 the pallet is formed by two structures 28, 29 spaced apart on either side of the compartment 12 and joined together at the end furthest from the lift shaft 10 by a cross member 30.

Each of the structures 28, 29 comprises two vertically spaced rails 31 and 32 (see FIG. 5) and sandwiched between the rails are the ends of laterally extending tines 33. The tines on each of the two structures 28, 29 extend part way across the compartment towards one another as shown in FIG. 3 and support the car wheels of a car in the compartment. The tines at the ends of the pallet are raised above the level of the remaining tines on the pallet to prevent a car from inadvertently rolling off either end of the pallet.

The pallet is movably arranged so that it can be moved into the lift space to receive a car from the lift as described later. The pallet is supported by a number of pairs of vertically spaced flanged rollers 34 which are rotatably mounted on stub shafts 35 extending horizontally from the members 15. Pairs of rollers 34 are provided in both the compartment and the lift space so that the pallet may be supported in either place. The lower of each of the stub shafts carries an additional roller 34a engaging with a further member 32a of the pallet spaced inwardly of the member 32 below the tines 33.

The pallet is driven out of and into its compartment by a reversible electric motor 36 rigidly mounted on the cross member 30 which motor has two output shafts 37 extending to either side of the compartment. Secured to the ends of each shaft 37 are pinions 38 which engage with racks 39 extending along the sides of the compartment and secured to the members 15.

The electric motor 36 is controlled by switch gear 36a which render the motor inoperative at predetermined limits of travel of the pallet. A brake mechanism actuated by electromagnetic means also located in the housing of motor 36 is provided for stopping rotation of the motor 36 which electromagnetic means are operated in conjunction with the switch gear for the motor.

The system is arranged to be substantially completely under automatic control. For this purpose indicating means are provided at ground level to show which of the compartments are vacant, and selector mechanism is provided for selecting a compartment into which a car is to be dispatched. The car is maneuvered on to the lifting frame 18 which is at the bottom of its travel whereupon the motor which drives the sprockets 20 is set into operation and is automatically stopped by control means (not shown) when the structure reaches a position slightly above the level where a pallet is situated in the selected compartment as shown in the top arrangement of FIG. 4. The switch mechanism for operating the pallet is then actuated so that the pallet is moved into the lift shaft below the lifting frame as shown in the center arrangement of FIG. 4. Towards the end of the movement of the pallet switch 36a is operated which switches off the motor 36 and actuates the brake mechanism to stop the pallet, and at the same time a switch is actuated which commences lowering of the lifting frame. The tines of the lifting frame and the tines of the pallet are so dimensioned and positioned that when the lifting frame and pallet are in appropriate relative positions the tines of the lifting frame pass through the spaces between the tines of the pallet and vice versa. The car on the lifting frame is thereby transferred to the pallet. When the car has been deposited on the pallet a switch associated with the motor 36 is actuated so that the motor moves the pallet with the car on it into the compartment as shown in the bottom view of FIG. 5. When the pallet is nearly in the compartment switch 36a is actuated to switch off the motor 36 and to apply the brake means. In the meantime the lifting frame will have returned to the ground and its motor switch (not shown) will have been triggered for deenergizing its motor.

Below the space occupied by the pallet in each compartment there is arranged an apron (not shown) which extends across the compartment and prevents extraneous matter from one vehicle falling through on to another vehicle.

It will be appreciated that the aforesaid framework may be arranged to stand independently on its own foundation or may be supported against a wall of a building, in which case parts of the framework are keyed into the building.

Figure 7:
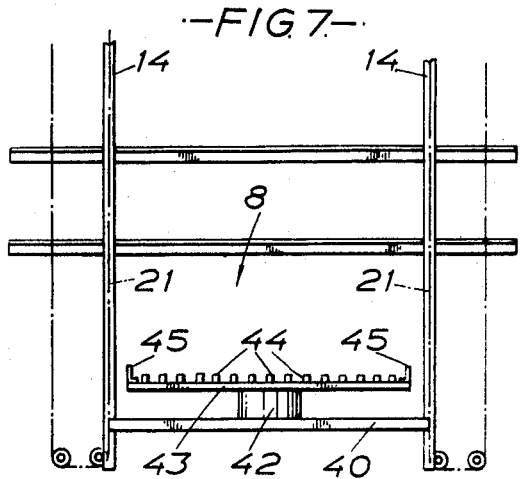
FIG. 7 is a similar view to FIG. 1 showing part of a modified system.
Figure 8:
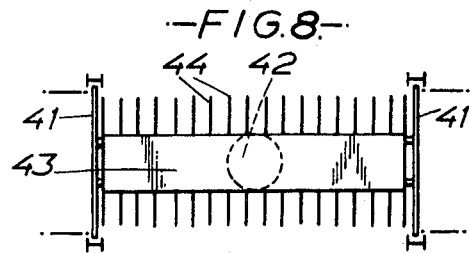
FIG. 8 is a plan view looking in the direction of the arrow 8 of FIG. 7.

Referring now to FIGS. 7 and 8 of the drawings there is shown a modified form of lifting frame. The frame comprises a base member 40 which extends along the lift shaft and has secured at either end, cross members 41. The ends of the cross members 41 are secured to stretches of the aforesaid chains 21. At the center of the base member is an upwardly extending shaft 42 which is rotatably supported on the base member and means are provided for rotating the shaft in either clockwise or anti-clockwise direction. To the upper end of the shaft is secured a platform 43 from which extend laterally on either side a number of spaced tines 44 which support the wheels of a motor vehicle. To prevent a motor vehicle from accidently rolling off the lift platform the end tines 45 extend above the remainder of the tines. The rotatable lift platform enables cars to be driven into the lift shaft from one direction and on return to the lift platform after parking the car can be rotated through 180° on the platform and then can be driven out in the opposite direction to which it arrived. Also in the case where cars are required to enter and leave from one side of the framework the lift platform can be rotated through 90° so that it extends laterally of the framework. The car is then driven on to the platform which is rotated through 90° and then moved up the lift shaft to a receiving space. The reverse procedure is adopted for removing the car from the parking system.

Referring now to FIGS. 9 and 10 an improvement of the lifting platform shown in FIGS. 7 and 8 is illustrated. The lift platform has a number of vertical posts 46 spaced apart along either side thereof and at either end of the lift platform there are mounted on the posts photoelectric cells 47 for detecting cars supported on pallets and extending too far out into the lift shaft. The photoelectric cells are arranged to operate the aforesaid lifting structure to stop the lift. Also supported on the lifting structure is a boarding platform. The boarding platform comprises a base structure 48 which extends along the lift structure below the lift platform 43. The base structure 48 has a splined bore and the shaft 42 is splined so that the member is slidable up and down the shaft but rotates with the shaft. A number of spaced tines 49 extend laterally from either side of the base member which tines register with the spaces between the tines 44 on the platform 43 of the lift structure when the lift structure moves to its lowest position as illustrated in FIG. 10. The ends of the base structure 48 engage buffer stops 50 at the bottom of the lift shaft and further downward movement of the lift platform moves the base structure upwardly with respect to the platform so that the tines 49 move into the spaces between the tines 43 so that a substantially continuous surface is formed. When the lift structure moves up the lift shaft the base structure moves downwardly with respect to the lift platform and rests on the base member 40 of the lifting structure. The resulting space between the base structure 48 and the platform 43 can then receive a pallet from one of the aforesaid compartments for transfer of a car to or from the lifting structure.

Turning now to the system illustrated in part in FIGS. 11 to 13 it is also proposed to arrange a mechanical storage system substantially as described above adapted for storing containers. The system is modified as illustrated in FIG. 13 in that the lifting platform comprises two pairs of horizontal support members 52, 53 located on either side of the lifting structure each supporting inwardly directed spaced tines 54. The tines are pivotally arranged about horizontal axes to that they can be swing upwardly so that when the lifting structure moves down over a container 55 the upwardly directed tines pass on either side of the load and can subsequently be swung down into the horizontal plane so that the lift can bring the tines 54 into engagement with the underneath of the container which is supported at the bottom of the lift shaft on spaced bogies 65. The ends of the horizontal support members 52, 53 are guided in vertically extending columns 14 and are connected to stretches of chains (not shown) which move the lifting structure up and down the lift shaft.

In this instance the pallets which are located in each compartment comprise control structures 56 from which spaced tines 57 extend on either side. At the end of the pallet there are provided cross members 58 the ends of which are provided with rollers 59 for engaging tracks 60 extending along the compartment and across the lift shaft. The pallet is driven into and out of the lift shaft by a motor 61 located at one end of the pallet having output shafts 62 extending to either side of the compartment. Pinions 63 are secured to the ends of the output shafts which pinions engage on racks 64 extending along the sides of the compartment. The remainder of the features of the framework, control means and operation of the container storage system are identical to those described above for the mechanical car parking system.

The aforesaid tines on the lifting structure and the pallet may be of round or rectangular or other section. Whilst a motor vehicle will only be on the lifting structure for a brief time it could be parked for a long period on a pallet. For this reason the pallet tines may be of plate-like form, spaced for the passage of round or narrower tines of the lifting structure. Moreover, the pallet tines may comprise flat plates mounted on carrier rods to be rockable about the rod axes for at least limited distances. Thus a vehicles wheels can rest on flat surfaces which may be in a horizontal or inclined plane.

We claim:

1. A multi-story mechanical storage system comprising a vertical lift shaft, means providing entry into said lift shaft at the lower end thereof, two columns of superimposed individual spaces for receiving articles, said columns being arranged on opposite sides of said lift shaft, all said spaces being arranged adjacent to said lift shaft and in register therewith, and each space in one column lying level with a space in the other column, a lifting structure for articles in said shaft, said lifting structure being an integral construction comprising a base portion, an elevated central portion on said base portion and a number of spaced tines extending laterally from each side of said elevated central portion for supporting an article, means for raising and lowering said lifting structure in said lift shaft, a single pallet in each receiving space, each pallet comprising two horizontal longitudinal members spaced apart so that they lie beyond the ends of the tines on opposite sides of the elevated central portion of the lifting structure, each of said longitudinal members being provided with spaced tines extending laterally inwardly toward the longitudinal center line of the pallet for supporting an article, rails in each receiving space and secured to opposite sides of the lift shaft on a level with the rails in each receiving space, rolling means mounted on the underside of the respective pallet and cooperating with said rails so that said pallet may have reciprocal movement in a horizontal plane between a first limit position wherein said pallet is wholly located in its individual receiving space and a second limit position wherein said pallet projects substantially into said lift shaft with its tines positioned so that the tines of the lifting structure may pass vertically between the tines of the pallet member, individual drive means associated with each pallet and control means for causing at any time a single one of said individual drive means to move the associated pallet between its limit positions to move an article carried thereby between positions in the respective receiving space and into the path of the lifting structure, where a defined vertical movement of the lifting structure will cause said tines of said pallet and said lifting structure to pass between one another to effect transfer of an article between the lifting structure and the pallet.

2. A storage system according to claim 1, wherein each pallet is constrained to move from its receiving space into the lift shaft and vice versa by a number of pairs of superimposed rollers on opposite sides of the receiving space and of the lift shaft between which the longitudinal members move, one roller of each pair engaging an upper part of the longitudinal member and the other roller engaging the under part.

3. A storage system according to claim 1 wherein each pallet is provided with an individual electric motor for driving it.

4. A storage system according to claim 3 wherein the electric motor is mounted on a cross member of the pallet and further comprising a cross shaft driven by said motor and extending for substantially the whole width of the pallet, pinions on the ends of the shaft, and racks engaged by said pinions, said racks being mounted on opposite sides of the receiving space and extending towards the lift shaft.

5. A storage system according to claim 3 wherein said electric motor has control means adapted to render the motor inoperative at predetermined limits of travel of the pallet, said means being so arranged that the pallet tines are accurately located in respect to those of the lifting structure in the lift shaft so as to ensure that said structure can pass through the spaces between the tines of the pallet.

6. A storage system according to claim 5 wherein the control means for rendering the electric motor inoperative comprise switch mechanism operated by movement of the pallet and in circuit with the motor, and electromagnetic means adapted to control brake mechanism associated with the motor.

* * * * *